(12) United States Patent
Britton

(10) Patent No.: US 8,006,992 B2
(45) Date of Patent: Aug. 30, 2011

(54) CHILD TRANSPORT VEHICLE

(75) Inventor: Daniel William Britton, Calgary (CA)

(73) Assignee: Thule Child Transport Systems Ltd., Vancouver (CA)

( * ) Notice: Subject to any disclaimer, the term of this patent is extended or adjusted under 35 U.S.C. 154(b) by 607 days.

(21) Appl. No.: 11/532,042

(22) Filed: Sep. 14, 2006

(65) Prior Publication Data

US 2008/0067776 A1    Mar. 20, 2008

(51) Int. Cl.
    *B62K 27/00* (2006.01)
(52) U.S. Cl. ......... 280/204; 280/292; 280/647; 280/651
(58) Field of Classification Search .................. 280/656, 280/63, 292, 639, 35, 647, 648, 651, 652, 280/204, 30; 403/398
    See application file for complete search history.

(56) References Cited

U.S. PATENT DOCUMENTS

| | | | |
|---|---|---|---|
| 5,087,061 A * | 2/1992 | Wallace | 280/30 |
| 5,224,720 A * | 7/1993 | Chaw et al. | 280/62 |
| 5,454,577 A * | 10/1995 | Bell | 280/204 |
| 5,474,316 A | 12/1995 | Britton | |
| 5,829,770 A * | 11/1998 | Chiu | 280/204 |
| 6,193,436 B1 * | 2/2001 | Ellis | 403/331 |
| 6,237,995 B1 * | 5/2001 | Dierickx | 297/130 |
| 6,739,790 B1 * | 5/2004 | Crudele | 403/290 |
| 6,767,028 B2 | 7/2004 | Britton | |
| 6,896,275 B1 * | 5/2005 | Liu | 280/204 |
| 7,143,912 B2 * | 12/2006 | Caneba | 224/153 |
| 7,172,206 B2 * | 2/2007 | Staszak | 280/204 |
| 7,246,805 B2 * | 7/2007 | Neal et al. | 280/35 |
| 7,354,058 B2 * | 4/2008 | Chou | 280/651 |
| 7,458,597 B2 * | 12/2008 | MacDougall | 280/491.1 |
| 2002/0074764 A1 | 6/2002 | Allen et al. | |
| 2003/0042711 A1 * | 3/2003 | Hsu | 280/651 |
| 2004/0094919 A1 * | 5/2004 | Roder et al. | 280/30 |

FOREIGN PATENT DOCUMENTS

CA    2208809    6/1998

OTHER PUBLICATIONS

2005 Product Guide, Chariot Carriers Inc., Sep. 2004.

* cited by examiner

*Primary Examiner* — Kevin Hurley
*Assistant Examiner* — Maurice Williams
(74) *Attorney, Agent, or Firm* — Bennett Jones LLP

(57) ABSTRACT

A child transport vehicle including: a frame, displacement means connectable to the frame, and a transport attachment storage system including one or more engagement devices operable and positioned to store an unused transport attachment in an inoperable position on the vehicle.

19 Claims, 5 Drawing Sheets

US 8,006,992 B2

CHILD TRANSPORT VEHICLE

FIELD OF THE INVENTION

The present invention is directed toward child transport vehicles and in particular directed toward transport vehicles that may accommodate a variety of transport attachments directly on the body of the transport vehicle when a particular transport attachment is not in use.

BACKGROUND OF THE INVENTION

Child transport vehicles, such as strollers, jogging stroller, or trailers for use with bicycles, hikers, skiers, are known in the art. U.S. Pat. No. 5,444,316 and U.S. Pat. No. 6,767,028 teach examples of child transport vehicles.

To enhance the usefulness of these vehicles, some have been adapted for conversion between joggers, strollers and trailers by interchanging transport attachments such as wheels, skis, etc. and conveyance connection arms (i.e. hitch arms and wheel support arms). However, in those vehicles that have the capability to convert, the problem may arise of storing any transport attachments that may not be in use.

SUMMARY

In accordance with a broad aspect of the present invention there is provided a child transport vehicle comprising: a frame, displacement means connectable to the frame, and a transport attachment storage system including a conveyance connection arm engagement device positioned to store an unused conveyance connection arm in an inoperable position on the vehicle.

In accordance with another broad aspect of the present invention, there is provided a child transport vehicle comprising: a frame, a rear wheel axle on the frame operable to secure a rear wheel, a transport attachment storage system including a transport attachment engagement device on the frame and positioned above the rear wheel axle, the transport attachment engagement device formed to secure a transport attachment in a non-operable position.

In accordance with another broad aspect of the present invention, there is provided a child transport vehicle comprising: a frame including a front end and a rear end, displacement means connectable to the frame, a transport attachment storage system including a first transport attachment engagement device on the frame adjacent the front end of the frame and a second transport attachment engagement device on the frame adjacent the rear end of the frame, the transport attachment engagement device formed to secure a transport attachment in a non-operable position.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The vehicle of the present invention is adapted to store a transport attachment for the vehicle when such transport attachment is not in use. The storage of transport attachments may be simplified by the use of a transport attachment storage system. By storing the transport attachment on the carrier, loss of loose parts may be avoided, and optional transport attachments may be carried on the carrier so that a conversion between transport modes can be made on the go, when the vehicle is away from the normal storage locations, for example, the operator's home or automobile.

Transport modes for a child carrier may include, for example, a walking-speed stroller mode, a jogging stroller mode, a hiking trailer mode, a skiing trailer mode, and a bicycle trailer mode. The transport attachment storage system can accommodate a variety of transport attachments including, but not limited to any of a wheel, a ski, a bicycle trailer hitch arm, a displacement means support arm, such as a front wheel support arm or a ski installation bracket, and a hiking/skiing harness arm when that arm is not being used.

Figure 1:
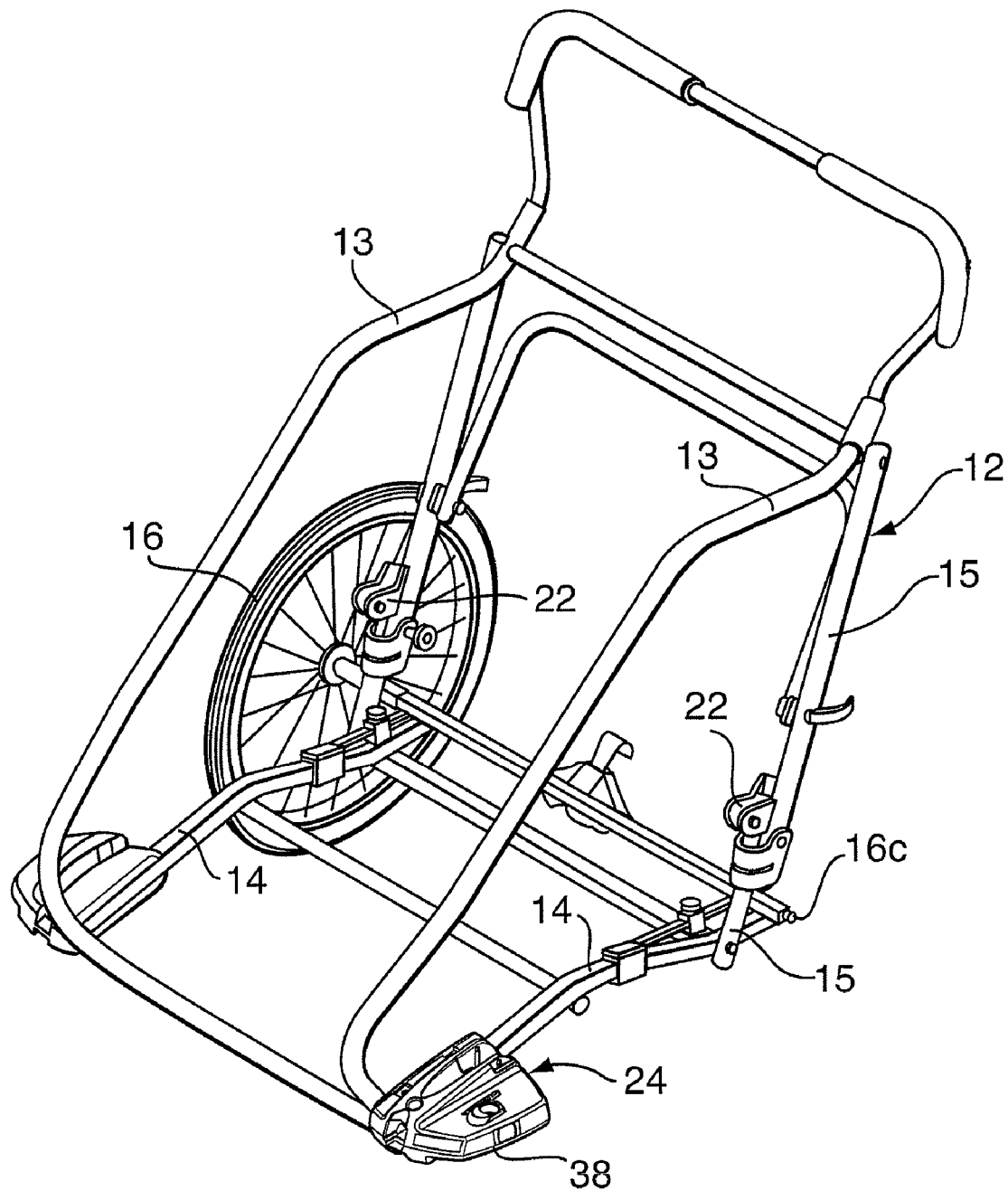
FIG. 1 is a perspective view of a vehicle frame according to one aspect of present invention.
Figure 2A:
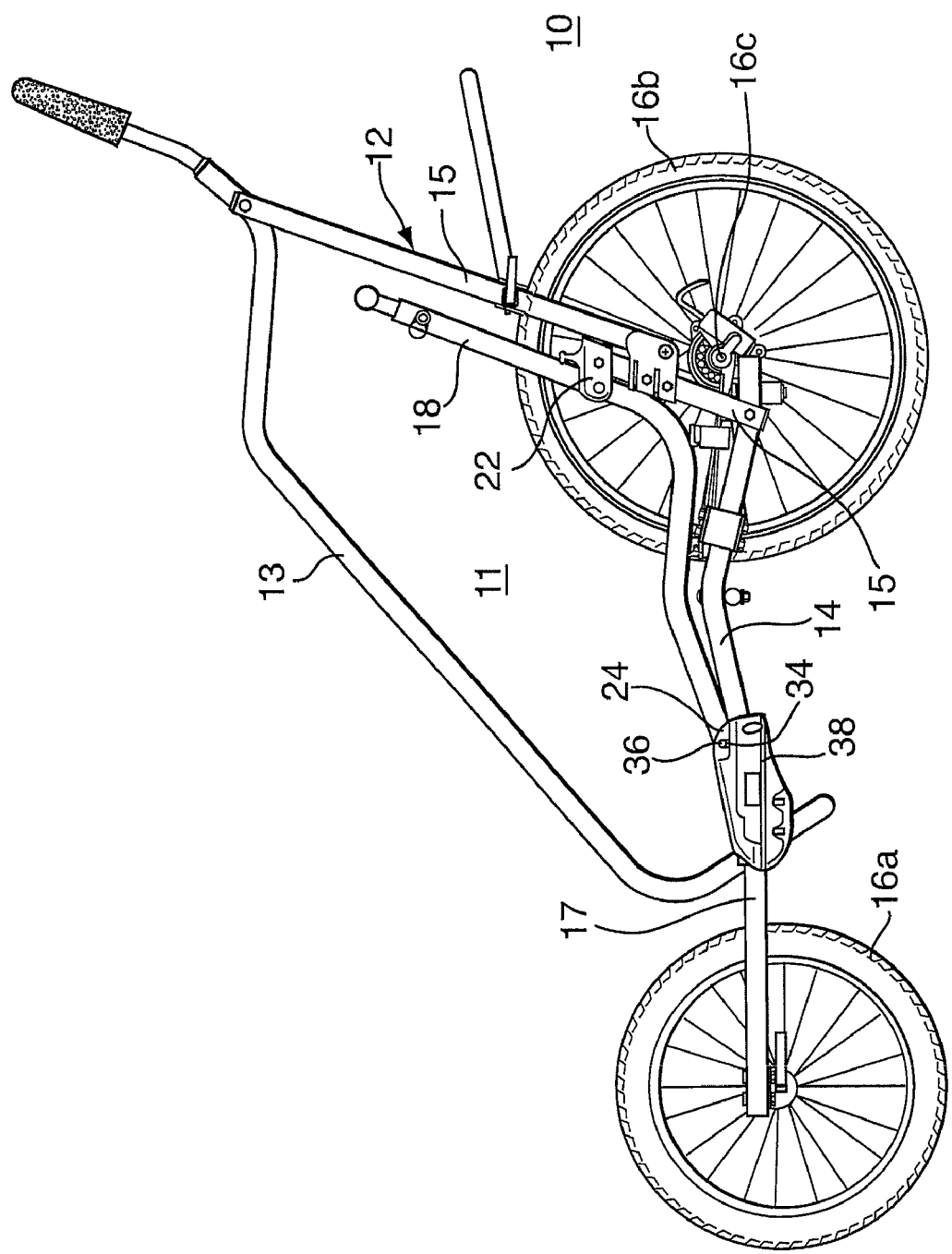
FIG. 2A is a side elevation of an embodiment of a child carrier vehicle according to the present invention in a jogging stroller mode.
Figure 2B:
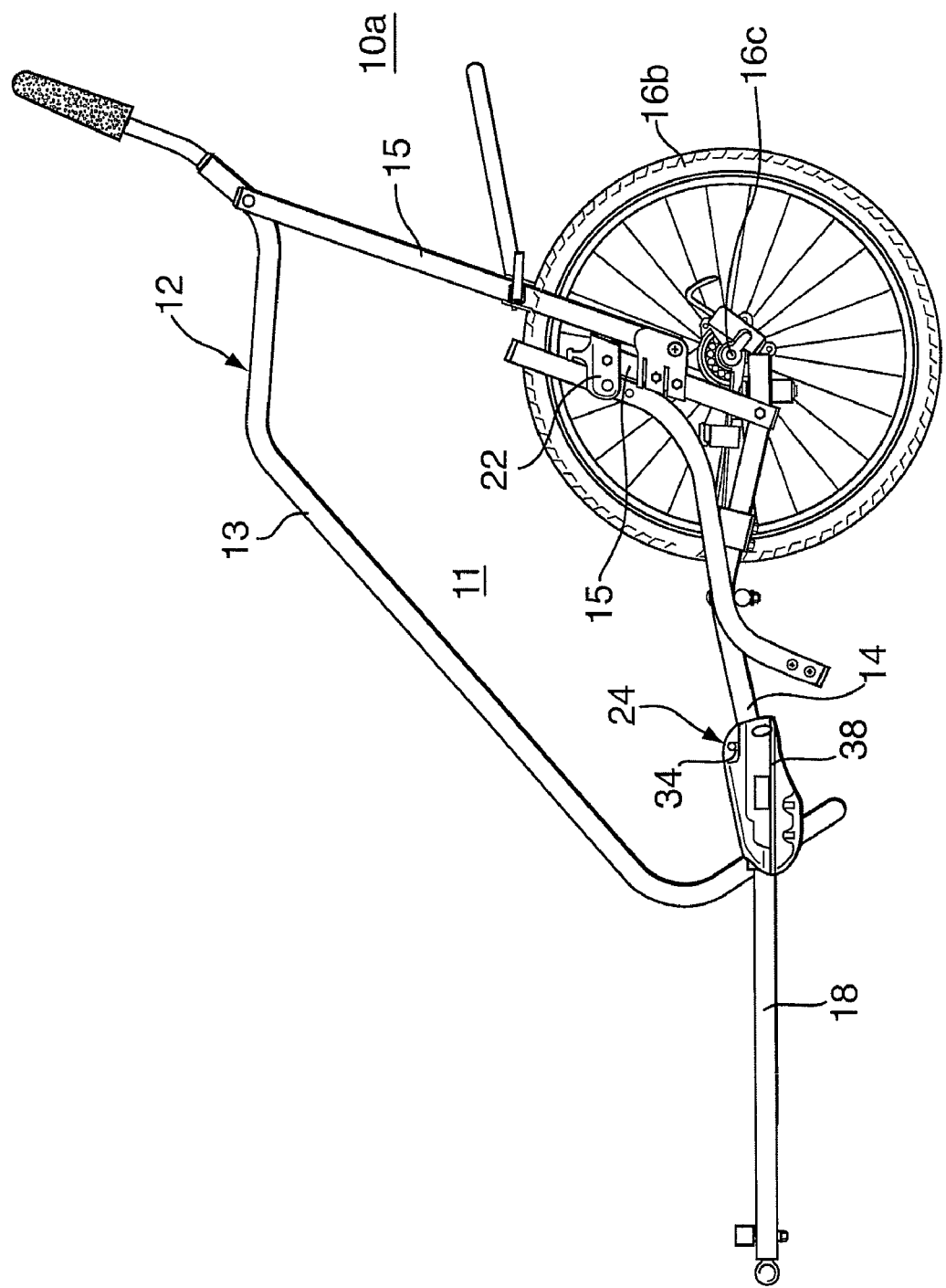
FIG. 2B is a side elevation of the vehicle of FIG. 2A converted to a bicycle trailer mode.

Referring to FIGS. 1 and 2, a child transport vehicle frame 12 is shown and two possible configurations 10, 10a of a child transport vehicle according to the present invention are shown. Vehicle configuration 10 of FIG. 2A is a child carrier in a jogger stroller mode, while in FIG. 2B the vehicle has been converted such that it is in a configuration 10a operable in a bicycle trailer mode. The vehicle in the two configurations is similar in at least some basic respects, for example, each include a frame 12, at least one transport attachment which may include, for example, displacement means including, for example, at least one wheel 16, as shown, ski, blade, rollers, tracks, etc., and/or a conveyance connection arm. Some basic vehicle features will be described with reference to FIG. 1, with occasional comparisons between FIGS. 2A and 2B.

Frame 12 may be sized and constructed to accommodate a child, which in the illustrated embodiment will be in area 11. Although normally made of aluminum tubing, the frame can be formed of any suitable material such, as for example, rods, tubing, bars, sheets, etc, of polymers, metal, or wood. As will be appreciated, the frame may include or support various other features such as a seat, fabric covering, storage bins, etc.

Vehicle frame 12 may be formed in various ways with various configurations of structural members. In the illustrated embodiment, vehicle frame 12 includes a plurality of structural members including upper members 13, lower members 14 and upright members 15. The members in the illustrated embodiments of FIGS. 2A and 2B are generally positioned symmetrically about a center vertical plane and although members are positioned on each side of the vehicle, only the members on one side can be seen as the members on the other side are positioned out of view behind their corresponding members on the closest side.

At least one wheel 16 or other displacement means may be provided to support the weight of the vehicle and its passengers and cargo and allow the vehicle to be moved over the ground. Although only one wheel is shown in FIG. 1, other wheels have been removed to facilitate illustration. Wheels 16 are connected to frame 12. Vehicle 10 of FIG. 2A is shown in a jogging stroller mode including a front wheel 16a mounted on front wheel support arms 17, also termed forks, and upright wheels 16b mounted by way of axle connections 18 to frame 12. In FIG. 2B, vehicle 10 has been converted to vehicle configuration 10a by removing front wheel 16a, leaving only upright wheels 16b. It is noted that although the vehicle operates in both modes using a pair of upright wheels, only one upright wheel 16b is shown. The closest upright wheel in the side elevations of FIGS. 2A and 2B have been removed to facilitate illustration. It will be appreciated that in some convertible carriers, wheels 16a and/or 16b may be replaced or supplemented with other numbers or configurations of wheels, skis, tracks, rollers or blades to permit other forms of transport.

Conveyance connection arms permit the vehicle to be transported and operated in various ways depending on the operational mode of the vehicle. Conveyance connection arms may operate, for example, to support the wheels or other displacement means or to permit towing connection, for example to a bicycle or a person. For example, in FIG. 2A vehicle 10 is shown in a jogging stroller mode and includes two conveyance connection arms, operating as front wheel support arms 17, also termed forks, to support front wheel 16a. However, in FIG. 2B, wherein vehicle 10a is in bicycle trailer mode, the conveyance connection arm is a bicycle trailer hitch arm 18 connected to frame 12. Although not shown, another conveyance connection arm may include, for example, a hiker/skier harness arm.

To permit convertibility, the various transport attachments may be removably connected to the vehicle such that they can each can be removed from an operational position so that another transport attachment can be installed for another operational purpose.

A vehicle according to the present invention further includes a transport attachment storage system to permit storage on the vehicle of an unused transport attachment, for example a displacement apparatus and/or a conveyance connection arm. The transport attachment storage system positions the unused transport attachment out of a position for normal operation of that attachment. For example the vehicle of FIG. 2A can be converted to operate between a jogging stroller mode, as shown therein, and a bicycle trailer mode, such mode being shown in FIG. 2B. The presently illustrated vehicle includes a transport attachment storage system to store (i) bicycle trailer hitch arm 18 when the vehicle configuration 10 is intended for jogging stroller operation (FIG. 2A) and (ii) front wheel support arms 17 when the vehicle configuration 10a is intended for use as a bicycle trailer (FIG. 2B). Although not clearly illustrated, in FIG. 2B, the front wheel forks have been removed from the front wheel, separated into two arms and each stored separately on the vehicle. A transport attachment storage system may operate to engage a variety of attachments (one or more at a time) or the storage system may be configured such that it is only operable to store one particular kind of transport attachment, although this may limit its usefulness.

The transport attachment storage system may include an engagement device on the vehicle for accepting and releasably retaining a transport attachment. The engagement device may be variously positioned on the vehicle, for example, on frame 12, as shown, or on other components such as on the vehicle's cover. The arm engagement device may take various forms some of which for example may include pockets, grippers, clamps, straps including ties, snaps, clips, buckles, hook and loop connectors, catches, connectors, etc. In one embodiment, which may be useful where there is more than one unused transport attachment to be stored, the system may include more than one engagement device. For example, a vehicle may include a single engagement device, or engagement devices in various locations on the vehicle.

Although it is to be understood that the present transport attachment storage system may be useful to store various transport attachments, including for example, wheels, skis, and conveyance connector arms, the description of the invention will proceed to describe particular examples of a transport attachment storage system handling a conveyance connector arm.

In the illustrated embodiment, the vehicle frame 12 supports a plurality of engagement devices including a pair of devises 22 and a connector 24. Clevises 22 and connector 24 operate in various different ways to engage and releasably retain a conveyance connection arm positioned therein.

Figure 3:
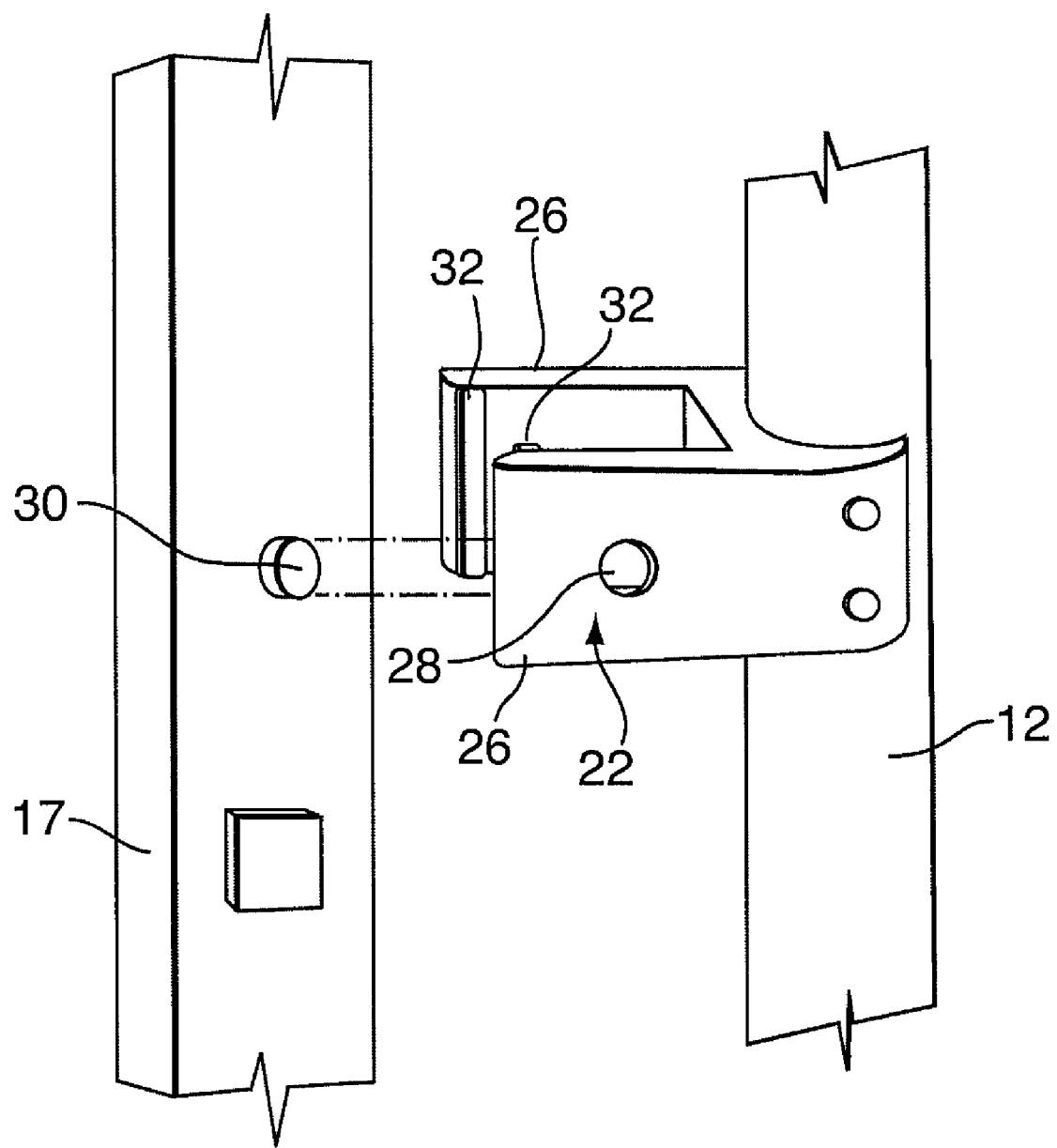
FIG. 3 is an enlarged perspective view of a connector useful in the present invention.

Each clevis 22, for example, may operate in various ways to engage and retain the arm positioned therein. The clevis may be formed in various ways and of various materials and may including various retaining mechanisms, including knobs, clamps, resilient members, pinned arrangements, frictional configurations, etc. Referring to FIG. 3, for example, each clevis 22 may be U-shaped including a pair of extensions 26 defining an opening therebetween. The opening is sized, as by the relative position of extensions 26, to accommodate various connection arms (17, 18) one at a time therein. Each clevis, in the illustrated embodiment, operates by a pinned connection to the part to be stored. A pinned connection can include a separate pin or a pin mounted on any of the part to be stored or the clevis. In the illustrated embodiment of FIG. 3, clevis 22 further includes an aperture 28 in at least one of the extensions positioned and sized to accept a pin 30 extending from a conveyance connection arm to be engaged. At least one clevis 22 may also include inner facing returns 32 adjacent the outer end of each extension 26 to grip about an arm to be engaged.

The illustrated devises 22 may operate to accept both a spring biased detent pin 30, such as that shown on arm 17, and or a fixed pin. For example, to accept a fixed pin one or both of extensions 26 may have biasing mechanisms such as by use of resilient materials, spring loaded mechanisms, etc. to permit flexing to enlarge the opening therebetween if urged apart. As such, an arm with a fixed pin may be forced between extensions causing them to flex apart to allow the arm and its pin to enter the opening and then the extensions may spring back once the pin is positioned below aperture 28, to engage the pin in the aperture. To remove the pin from engagement by the clevis in such an embodiment, the extension in which the aperture is formed may be formed to be biased out to permit the pin to move out of engagement with the aperture.

The pins engaged by such a clevis, such as pins 30 may already be provided on the arms for other purposes, as for connection on the vehicle for operational purposes of the arm. For example, pin 30 on arm 17 may also serve to secure that arm in its operational position to support wheel 16a. Alternately, the pin to be engaged by clevis 22 may be installed on its arm solely for the purpose of being engaged by the storage system.

At least one clevis 22, as illustrated, may also act to engage an arm by gripping it between extensions 26 and behind returns 32 on the extensions. Again, such engagement may be provided by forming the clevis extensions to be biased in a gripping position but be resiliently moveable or include spring loaded mechanisms such that they can flex out to permit the arm to pass between extensions 26, but will snap back towards each other when the arm has passed behind returns 32.

Figure 4:
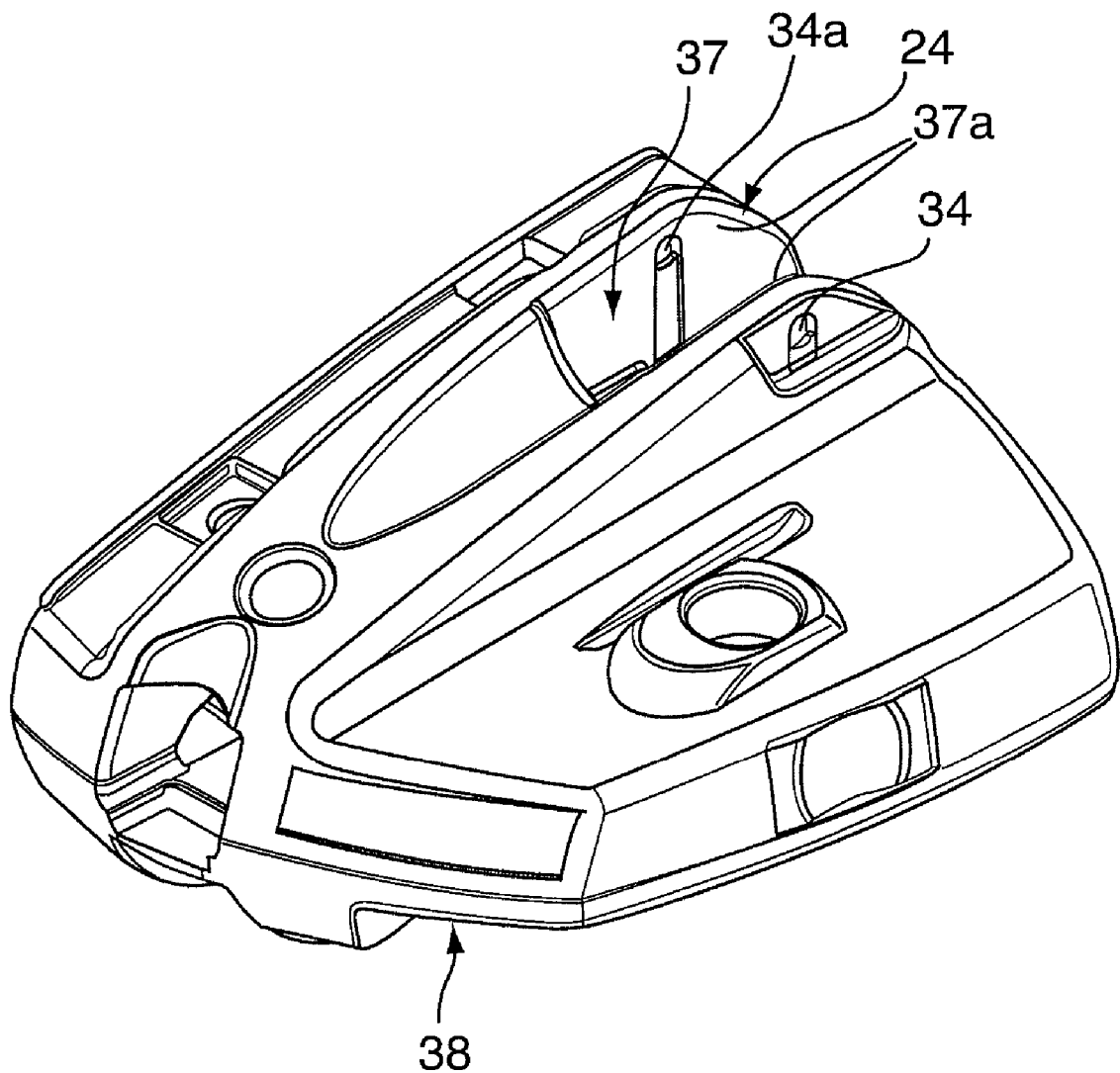
FIG. 4 is an enlarged perspective view of another connector useful in the present invention.

In the illustrated embodiment, each clevis 22 may be operated to engage, one or more at a time, both front wheel arm 17 and hitch arm 18. While it is possible to store unused conveyance connection arms only though the action of one engagement device, because of the length of hitch arm 18, a second arm engagement device may be useful to support and engage the arm at a second position. In the illustrated embodiment, connector 24 is positioned to support arm 18 at a second position, when the arm is already being engaged by clevis 22. With reference also to FIG. 4, connector 24 may releasably engage and retain arm 18 by use of various means and mechanisms. In the illustrated embodiment, connector 24 secures arm 18 by means of a pinned connection and includes, for example, an aperture 34 positioned to accept a pin 36 on or through the arm. In the illustrated embodiment, pin 36 is that pin used as back up pin to secure arm 18 in its operational position on the front of the vehicle. A primary pin connection between the arm and the connector cannot be seen in this drawing but operates through an aperture 34a positioned to accept a spring biased pin of the hitch arm, which spring biased pin is also used to secure the hitch arm in an operable position on the vehicle. In the illustrated embodiment, connector 24 includes a storage area 37 formed with an open upper end, which may be defined, for example, as a channel between side walls 37a, one of which includes aperture 34 and the other of which includes aperture 34a. Such an open configuration permits an arm to be set into the storage area in a relatively simple manner and more careful alignment operations, such as would be required to insert an arm in slot having a full cross sectional perimeter including an upper, lower and side walls, aren't required.

While in the illustrated embodiment connector 24 appears only to function to engage and releasably retain hitch arm 18, it is to be understood that it can be configured to accept other conveyance connection arms, as desired.

Although two forms of engagement devices are shown and described in detail, as stated previously, for conveyance connection arms, similar or other engagement devices may also be employed, as desired, to provide for storage of unused transport attachments such as wheels, skies, other forms of conveyance connection arms, etc.

Although the engagement device may be positioned in various locations on the vehicle, in one embodiment, the engagement device may be positioned externally of the vehicle covering for ease of access and to avoid handling of the engagement device and any transport attachment stored therein by the passengers. In one embodiment, for example, the engagement device is mounted on a frame member such that the engagement device is positioned external to the covering of the trailer. In the illustrated embodiment, for example, upright frame members 15 extend externally of the carrier cover and devises 22 are mounted thereon and a transport attachment conversion connector 38 is connected to one of the lower frame members 14 and extends out beyond the carrier covering. Connector 24, in the illustrated embodiment, is formed integral with the transport attachment conversion connector 38.

In one embodiment, it may be desirable to position the engagement device such that the stored transport attachment (i) does not overly block access, for example from the front, to the occupant compartment or any cargo storage areas and/or (ii) is distanced from contact with the passengers in the event of an accident or rollover. As such, the engagement device may be positioned to store the transport attachment in a position extending adjacent to frame members 13, 14 or 15. To position the unused transport attachments away from access areas, engagement devices 22, 24 may be mounted to upper frame 13 members, upright frame members 15 or lower frame members 14. In one embodiment, devices 22, 24 may be positioned such that the unused transport attachments are stored adjacent an intersection between frame members, as shown, such that characteristic curves in the attachments, such as a curved areas of the hitch arm 18, may be accommodated in angular areas of the frame, for example between upright frame members 15 and its connecting lower frame member 14 on one side of the frame.

It may also be useful to prevent an unused transport attachment from extending out from the vehicle (i.e. to avoid catching the arms), the engagement device may be positioned adjacent upright wheels, and for example in one embodiment between one of the upright rear wheels 16a and the adjacent frame. In another embodiment, selected frame members, such as upright frame members 15 each define a plane along a side of the vehicle and any engagement devices 22, 24 may be positioned to store the unused transport attachments substantially in the plane defined by one of the existing frame members, such as in plane parallel to or within the plane defined by one of the upright frame members 15.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A child transport vehicle comprising: a frame defining therewithin a child accommodating area and including a front end, a rear end, a lower frame member defining a lower region of the child accommodating area and an upright frame member extending upwardly from the lower frame member adjacent the rear end, the upright frame member defining a height of the child accommodating area, the child accommodating area being defined between the lower frame member and the upright frame member;
  displacement means connectable to the frame;
  a push handle extending from the upright frame member;
  a conveyance connection arm connectable to the frame; and
  a transport attachment storage system including a conveyance connection arm engagement device positioned on the upright frame member, the conveyance connection arm engagement device selected to releasably engage the conveyance connection arm to store the conveyance connection arm in an inoperable position on the vehicle with the conveyance connection arm extending at least in part alongside and substantially parallel to the upright frame member and a pinned connection between the conveyance connection arm and the conveyance connection arm engagement device, wherein in the inoperable position, the conveyance connection arm is positioned below the push handle and the push handle is positioned to be used to push the vehicle forward.

2. The child transport vehicle of claim 1, wherein the conveyance connection arm engagement device includes an open topped channel defined by channel sidewalls such that the conveyance arm can be set between the channel sidewalls and secured therein.

3. The child transport vehicle of claim 2, further comprising an inner facing return on each channel sidewall protruding into the open topped channel.

4. The child transport vehicle of claim 2, wherein the open topped channel faces forwardly such that a long axis defined parallel to the length of the channel sidewalls extends substantially vertically.

5. The child transport vehicle of claim 2, wherein the channel sidewalls are resilient and capable of flexing apart to permit installation of the conveyance connection arm therebetween.

6. The child transport vehicle of claim 1, further comprising a vehicle covering carried on the frame and wherein the conveyance connection arm device is positioned externally of the vehicle covering.

7. The child transport vehicle of claim 1, wherein the conveyance connection arm includes a bend along its length and the lower frame member and the upright frame member intersect at an angular area of the frame and the conveyance connection arm engagement device is spaced from the angular area a distance to position the bend of the conveyance connection arm adjacent the angular area of the frame.

8. The child transport vehicle of claim 1, wherein the conveyance connection arm includes a first end connected at a bend to a second end and the conveyance connection arm engagement device secures the conveyance connection arm with the first end extending alongside and substantially parallel to the upright frame member and the second end extending alongside the lower frame member.

9. The child transport vehicle of claim 1, further comprising a second conveyance connection arm engagement device positioned adjacent the front end of the frame, the second conveyance connection arm engagement device selected to releasably engage the conveyance connection arm along with the conveyance connection arm engagement device in the inoperable position.

10. The child transport vehicle of claim 1, wherein the conveyance connection arm is a trailer hitch arm.

11. The child transport vehicle of claim 1, wherein the conveyance connection arm is a front wheel support arm.

12. The child transport vehicle of claim 1, wherein the conveyance connection arm engagement device is selected to engage the conveyance connection arm in a position without extending out from the vehicle.

13. The child transport vehicle of claim 1, wherein the upright frame member extends along a first side of the vehicle and the vehicle further comprises a second upright frame member extending along a second side of the vehicle, a second conveyance connection arm and a second conveyance connection arm engagement device positioned on the second upright frame member, the second conveyance connection arm engagement device selected to releasably engage the second conveyance connection arm to store the second conveyance connection arm in an inoperable position on the vehicle.

14. The child transport vehicle of claim 1, further comprising a transport attachment connector to which the conveyance connection arm is connected when in an operable position, and in the inoperable position, the conveyance connection arm is detached from the transport attachment connector.

15. A method for converting a child transport vehicle from a first transport mode to a second transport mode, the child transport vehicle including: a frame defining therewithin a child accommodating area and including a front end, a rear end, a lower frame member defining a lower region of the child accommodating area and an upright frame member extending upwardly from the lower frame member adjacent the rear end, the upright frame member defining a height of the child accommodating area, the child accommodating area being defined between the lower frame member and the upright frame member; a push handle extending from the upright frame member; displacement means connected to the frame; a conveyance connection arm connectable to the frame; and a transport attachment storage system including a conveyance connection arm engagement device positioned on the upright frame member, the conveyance connection arm engagement device selected to releasably engage the conveyance connection arm to store the conveyance connection arm in an inoperable position on the vehicle with the conveyance connection arm extending at least in part alongside and substantially parallel to the upright frame member and a pinned connection between the conveyance connection arm and the conveyance connection arm engagement device; and the method comprising:
  disconnecting the conveyance connection arm from the child transport vehicle;
  installing the conveyance connection arm into engagement with the conveyance connection arm engagement device such that the conveyance connection arm is secured in an inoperable position on the vehicle with the conveyance connection arm extending at least in part alongside and substantially parallel with the upright frame member;
  securing an alternate conveyance device to the vehicle to place the alternate conveyance device in an operable position on the child transport vehicle to convert the child transport vehicle to the second transport mode; and
  pushing the stroller on the alternate conveyance device by applying force to the push handle while the conveyance connection arm remains secured in the inoperable position.

16. The method of claim 15, wherein the vehicle further comprises a transport attachment connector configured to secure the conveyance connection arm to the frame when in an operable position; and
  disconnecting the conveyance connection arm from the child transport vehicle further comprises removing the conveyance connection arm from the transport attachment connector such that it becomes detached from the child transport vehicle.

17. The method of claim 15, wherein installing includes pinning the conveyance connection arm to the conveyance connection arm engagement device.

18. The method of claim 15, wherein installing includes preventing the conveyance connection arm from extending out from the vehicle.

19. The method of claim 15, further comprising installing a second conveyance connection arm into engagement with a second conveyance connection arm engagement device such that the conveyance connection arm is secured in an inoperable position on the vehicle with the conveyance connection arm extending at least in part alongside and substantially parallel with a second upright frame member.

* * * * *